United States Patent
Sun et al.

(10) Patent No.: US 6,731,799 B1
(45) Date of Patent: May 4, 2004

(54) OBJECT SEGMENTATION WITH BACKGROUND EXTRACTION AND MOVING BOUNDARY TECHNIQUES

(75) Inventors: Shijun Sun, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 615 days.

(21) Appl. No.: 09/587,210

(22) Filed: Jun. 1, 2000

(51) Int. Cl.$^7$ .............................. G06K 9/30; G06K 9/48
(52) U.S. Cl. ...................... 382/173; 382/190; 382/242; 348/142; 348/155
(58) Field of Search ................................ 382/173, 242, 382/190, 103, 131, 266; 348/77, 135, 142, 143, 148, 149, 152, 154, 155, 169; 378/901

(56) References Cited

U.S. PATENT DOCUMENTS

| | | | | |
|---|---|---|---|---|
| 5,034,986 A | * | 7/1991 | Karmann et al. | 382/103 |
| 5,680,471 A | * | 10/1997 | Kanebako et al. | 382/128 |
| 5,691,769 A | * | 11/1997 | Kim | 375/240.18 |
| 5,717,463 A | * | 2/1998 | Brailean et al. | 375/240.12 |
| 5,748,775 A | * | 5/1998 | Tsuchikawa et al. | 382/190 |
| 5,764,283 A | * | 6/1998 | Pingali et al. | 348/169 |
| 5,854,856 A | * | 12/1998 | Moura et al. | 382/232 |
| 5,999,651 A | * | 12/1999 | Chang et al. | 382/215 |
| 6,400,831 B2 | * | 6/2002 | Lee et al. | 382/103 |
| 6,480,615 B1 | * | 11/2002 | Sun et al. | 382/103 |
| 6,553,150 B1 | * | 4/2003 | Wee et al. | 382/243 |
| 2001/0048753 A1 | * | 12/2001 | Lee et al. | 382/103 |

OTHER PUBLICATIONS

Fechter et al., "Signal Processing for a Digital HDTV Chromakey Mixer," Signal Processing: Image Communication vol. 5 p417–423, 1993.

Haritaoglu et al., "Hydra: Multiple People Detection and Tracking Using Silhouettes,"IEEE; Apr. 1999.

Stauffer et al., "Adaptive Background Mixture Models for Real–Time Tracking" IEEE Apr. 1999.

Michaels et al., "Frame–Rate Omnidirectional Surveillance & Tracking of Camouflaged and Occluded Targets," IEEE, Apr. 1999.

Paragios et al., "Unifying Boundary and Region–Based Information for Geodesic Active Tracking," IEEE, Apr. 1999.

Wren et al., "Pfinder: Real–Time Tracking of the Human Body," SPIE vol. 2615, Jun. 1996.

Crinon et al., International Organization for Standardization: Coding of Moving Pictures and Audio, ISO/IEC JTC1/SC29/WG11, MPEG–4 Video, Feb. 1998.

Gavrila, D.M., "The Visual Analysis of Human Movement: A Survey," Computer Vision and Image Understanding, vol. 73, No. 1; Jan., 1999.

\* cited by examiner

Primary Examiner—Bhavesh M. Mehta
Assistant Examiner—Christopher Sukhaphadhana
(74) Attorney, Agent, or Firm—Steven P. Koda

(57) ABSTRACT

Image data for an image frame are allocated among three groups. In one group are image data which are part of a derived motion boundary, along with image data which differ by at least a threshold amount from a corresponding point among normalized background data. In another group are image data which closely correspond to the normalized background image data. A third group includes the remaining pixels. An initial estimate for the object boundary is adjusted iteratively based on the groupings, followed by application of an active contour model.

35 Claims, 8 Drawing Sheets

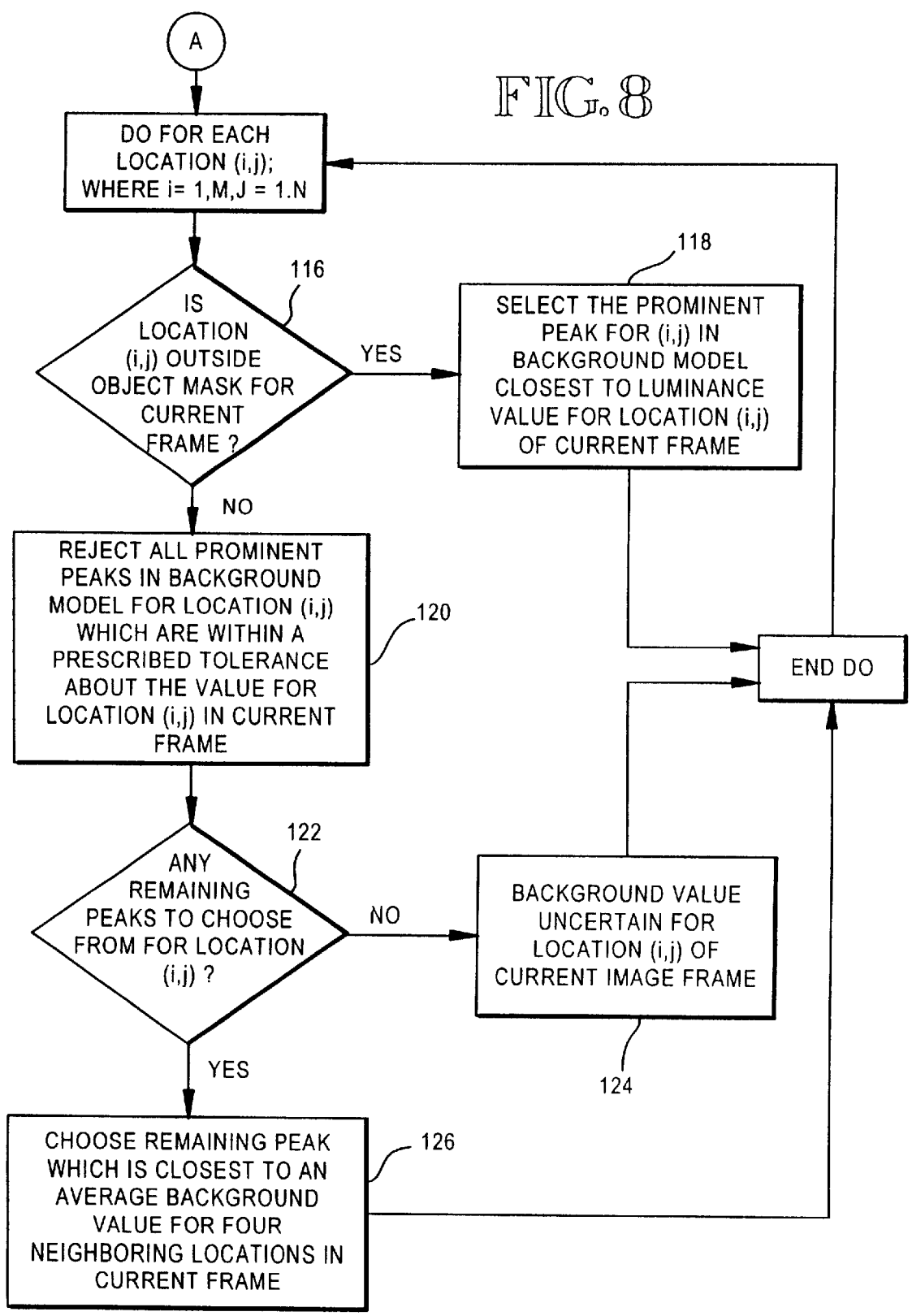

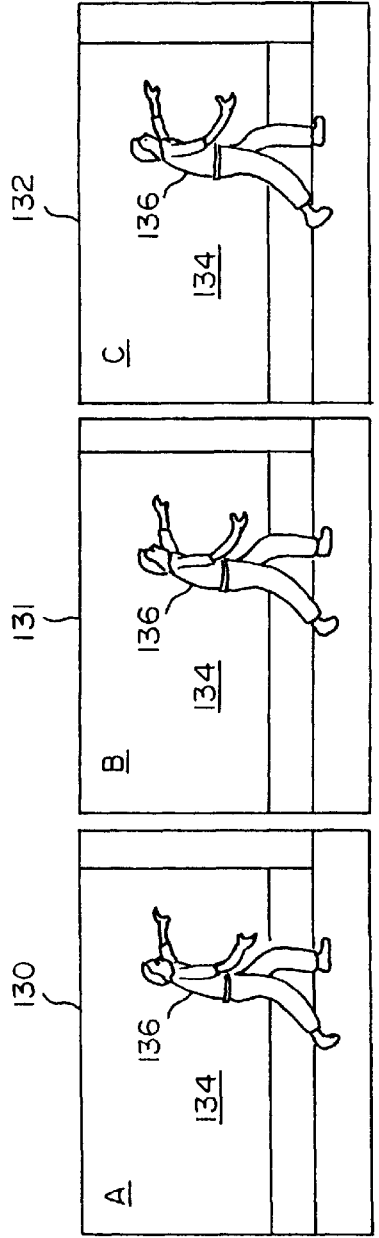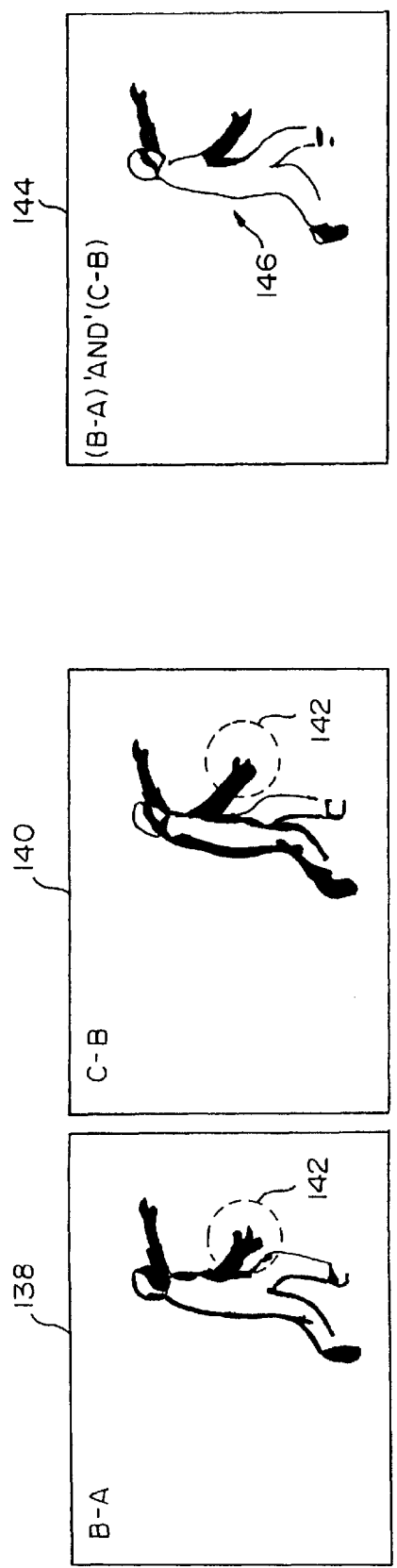

OBJECT SEGMENTATION WITH BACKGROUND EXTRACTION AND MOVING BOUNDARY TECHNIQUES

CROSS REFERENCE TO RELATED APPLICATIONS

This invention is related to U.S. Pat. No. 6,546,117 issued Apr. 8, 2003 based on U.S. patent application Ser. No. 09/323,501 filed Jun. 10, 1999 naming Sun et al. titled, "Video Object Segmentation Using Active Contour Model with Global Relaxation;" U.S. patent application Ser. No. 09/500,116 filed Feb. 8, 2000 naming Sun et al. titled, "Detecting and Segmenting Local deformation in a Tracked Video Object;" and U.S. Pat. No. 6,480,615 issued Nov. 12, 2002 based on U.S. patent application Ser. No. 09/333,317 filed Jun. 15, 1999 naming Sun et al. titled, "Motion Estimation Within Image Using Optical Flow With Adaptive Gradients." The content of all such applications are incorporated herein by reference and made a part hereof.

BACKGROUND OF THE INVENTION

This invention relates to tracking and segmenting an object within a sequence of image frames, and more particularly to methods and apparatus for segmenting and tracking a video object which may move and deform.

When tracking an object among multiple frames of a video sequence, an enclosed boundary of the object is identified in each frame. The object is the area within the boundary. The challenge in identifying the object boundary in a given frame increases as the constraints on a trackable object are relaxed to allow tracking an object which translates, rotates or deforms. For example, tracking non-rigid 3-dimensional objects introduces complexity into the tracking process.

Once the object is identified in one frame, template matching may be used in a subsequent frame to detect translation of the object. The template typically is the object as identified in the prior frame. Deformable models are used to detect objects which translate, rotate or deform. Various methods using deformable models are described below.

Yuille et al. in "Feature Extraction from Faces Using Deformable Templates," International Journal of Computer Vision, Vol. 8, 1992, disclose a process in which eyes and mouths in an image are identified using a model with a few parameters. For example, an eye is modeled using two parabolas and a circle radius. By changing the shape of the parabolas and the circle radius, eyes can be identified. Yuille et al. and other deformation models typically have encompassed only highly constrained deformations. In particular, the object has a generally known shape which may deform in some generally known manner. Processes such as an active contour model have relaxed constraints, but are only effective over a very narrow spatial range of motion. Processes like that disclosed by Yuille are effective for a wider spatial range of motion, but track a very constrained type of motion. Accordingly, there is a need for a more flexible and effective object tracker, which can track more active deformations over a wider spatial range.

Active contour models, also known as snakes, have been used for adjusting image features, in particular image object boundaries. In concept, active contour models involve overlaying an elastic curve onto an image. The curve (i.e., snake) deforms itself from an initial shape to adjust to the image features. An energy minimizing function is used which adapts the curve to image features such as lines and edges. The function is guided by internal constraint forces and external image forces. The best fit is achieved by minimizing a total energy computation of the curve. In effect, continuity and smoothness constraints are imposed to control deformation of the model. An initial estimate for one frame is the derived contour of the object from a prior frame. A shortcoming of the conventional active contour model is that small changes in object position or shape from one frame to the next may cause the boundary identification to fail. In particular, rather than following the object, the estimated boundary instead may latch onto strong false edges in the background, distorting the object contour. Accordingly, there is a need for an improved method for segmenting and tracking a non-rigid 3-dimensional video object.

SUMMARY OF THE INVENTION

According to the invention, constraints on the topological changes to an active contour from one frame to the next are relaxed. The contour is derived by minimizing contour energy while also considering normalized background information and motion boundary information. The normalized background information and motion boundary information contribute to defining the object boundary propagation from one frame to the next, so that the constraints on contour topology can be relaxed.

According to one aspect of the invention, a background model is derived to distinguish foreground from a normalized background within each image frame of a sequence of image frames. Such background model is derived for a generally stable background over a sequence of image frames According to another aspect of the invention, by comparing successive image frames, a forward frame difference and a backward frame difference are derived for a given frame. Combining the forward frame difference and the backward frame difference removes double image errors and results in a motion boundary for the given image frame.

According to another aspect of this invention, the image data for the given image frame are allocated among three groups. In one group are image data which are part of the derived motion boundary, along with image data which differ by at least a threshold amount from a corresponding point among the normalized background data. In another group are image data which closely correspond to the normalized background image data. A third group includes the remaining pixels, (i.e., pixels not part of the motion background, which do not closely correspond to the normalized background image data, and which do not differ from such normalized background data by the threshold amount.) In some embodiments morphological filtering is performed on the first group of image data with discarded image data placed in the third group.

To derive an object boundary estimate for a tracked object within the given image frame, an initial estimate is the derived object boundary from the preceding image frame. Such initial estimate is adjusted based on object tracking for the current image frame. In some embodiments other adjustments also are introduced, such as for detecting local affine deformations. The revised estimate of the object boundary then is processed based on the background model and the motion boundary information, along with refining using an active contour model.

In a preferred embodiment the background model is derived a preprocessing for the entire sequence of image frames. For a given image frame, object tracking and initial boundary estimation processes are performed. The motion boundary derivation then is performed along with an application of the active contour model.

According to another aspect of this invention, the result of the preprocessing and motion boundary processing is a revised estimate of the object boundary. Such revised estimate is processed. Starting from a first point of the revised estimate, a next point on the object boundary is derived by determining whether the adjacent point on the revised object boundary is in the first group, second group or third group of image data. If in the first group, then the contour boundary propagates outward by one pixel (so as to inflate the object boundary at the corresponding location on the revised object boundary). If in the second group, then the contour boundary propagates inward by one pixel (so as to deflate the object boundary at the corresponding location on the revised object boundary). Successive iterations are performed going around the object boundary with the points on the object boundary propagating inward or outward by one pixel according to which group contains the image data point.

When a point on the boundary is found in the third group, the object boundary either stays the same for such point or propagates inward depending on image edge information. Edge energy is derived for the image frame to derive a representation of image edges. When an angle between the point on the object boundary and the derived image edge is larger than $\pi/4$ and the edge energy at such point is very low (e.g., less than 1% of the maximum along the image edge), then the object boundary propagates inward at such data point. Otherwise the object boundary stands still at such image point.

According to another aspect of the invention, when the revised object boundary is divided into multiple regions, to avoid losing regions, joint pixels are added to form one composite region. Specifically, joint pixels are added where a smaller region is located within the revised object boundary. Such region would be dropped during processing of the revised estimate of the object boundary. In one embodiment the criteria for adding joint pixels includes: a pair of regions within the revised estimate of the object boundary with the narrowest gap are connected first; all joint pixels are to occur within the object boundary and cross the narrowest gap (a maximum gap length may be specified); and the joint pixels are placed in the first group of image data for purposes of processing the revised estimate of the image boundary.

According to another aspect of the invention, an active contour model is applied to the propagated object boundary to refine the object boundary as a final estimate for the given image frame.

According to one advantage of the invention, an object boundary for a deformable or movable object is more accurately derived by considering a motion boundary estimation. These and other aspects and advantages of the invention will be better understood by reference to the following detailed description taken in conjunction with the accompanying drawings.

BRIEF DESCRIPTION OF THE DRAWINGS

FIG. 8 is a continued flow chart of the method for extracting background information shown in FIG. 6;

FIGS. 9A–C are depictions of three image frames in a sequence of image frames;

FIGS. 10A–10B are depictions of a thresholded absolute forwarded frame difference for frame A and B of FIGS. 9A–9B;

FIG. 11 is a depiction of a motion boundary for the image frame of FIG. 9B derived according to a method embodiment of this invention;

DESCRIPTION OF SPECIFIC EMBODIMENTS

Overview

Figure 1:
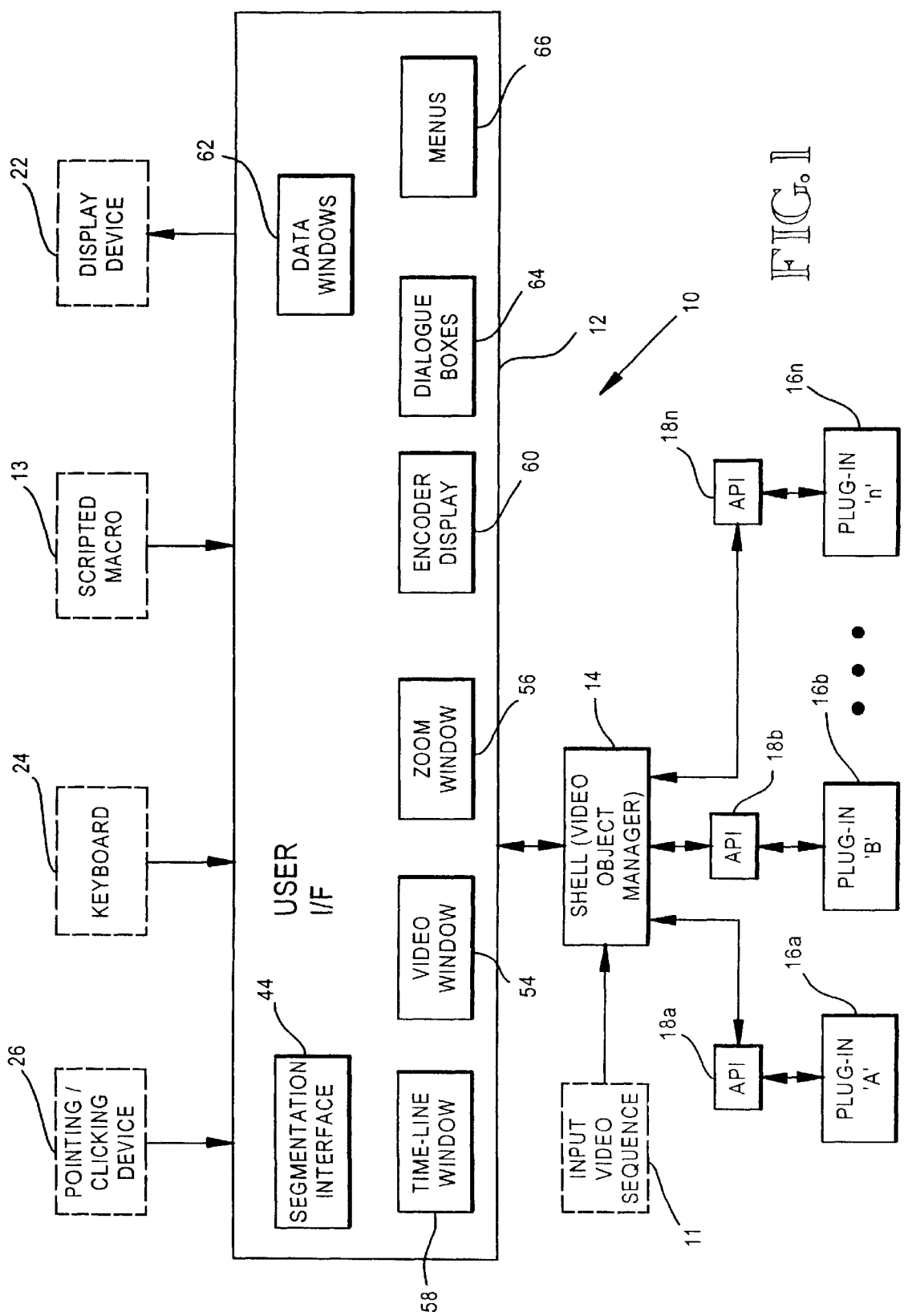
FIG. 1 is a block diagram of an interactive processing environment for tracking video objects among a sequence of video frames.

FIG. 1 shows a block diagram of an interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
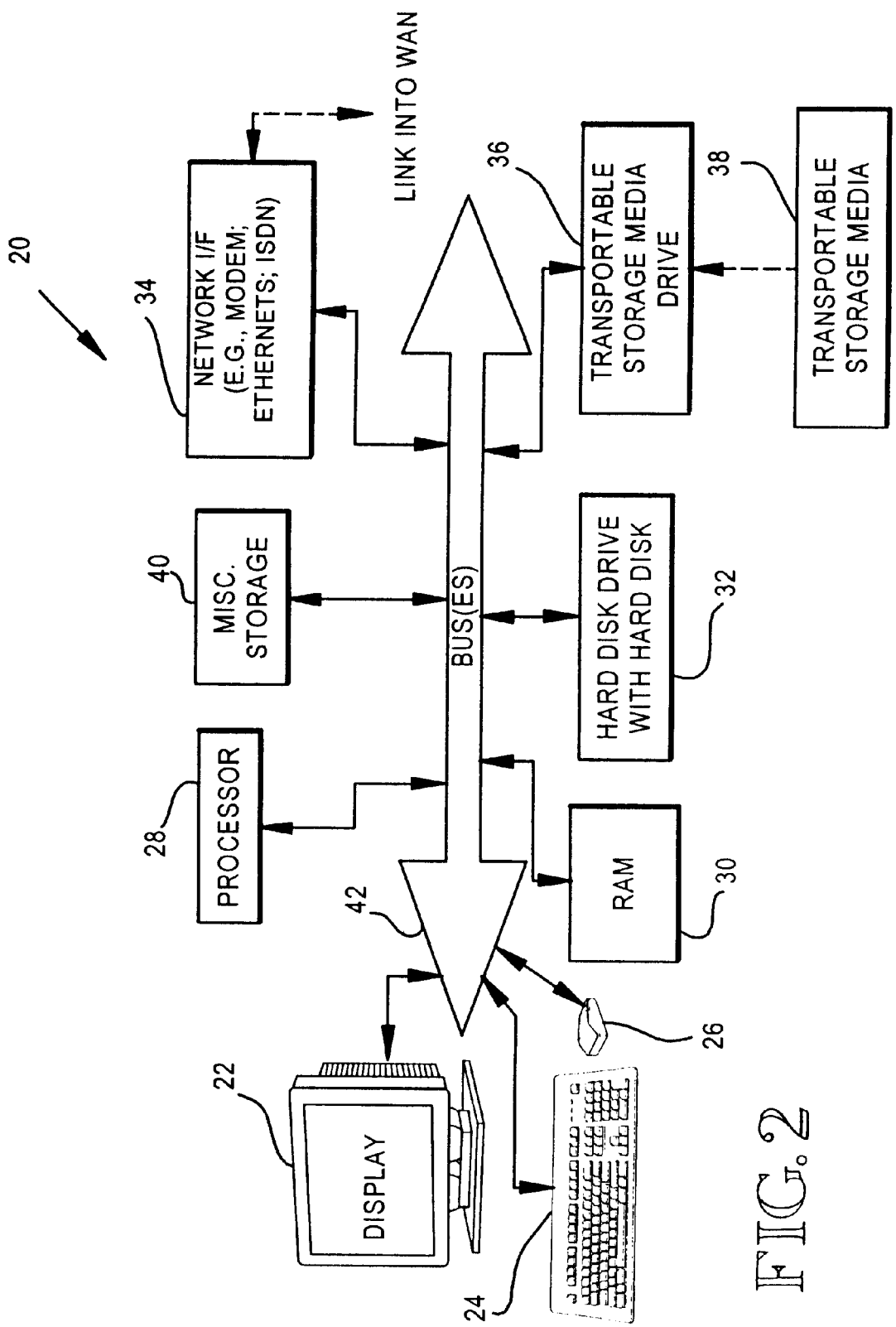
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking, morphological processing and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In one embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation plug-in, tracking plug-in and morphological plug-in do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Object Tracking and Segmentation

Figure 3:
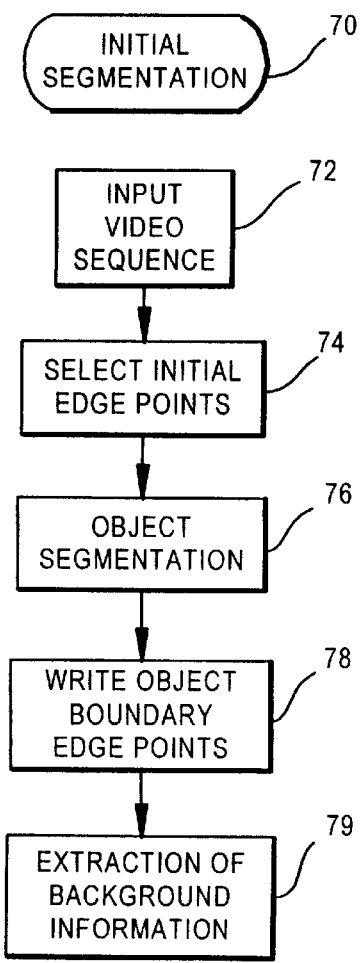
FIG. 3 is a flow chart for a segmentation process for initially selecting and segmenting an object to be tracked.

To track an object, the first step is to define a template to use which corresponds to the object. FIG. 3 is a flow chart 70 for initially segmenting a video object according to an embodiment of this invention to achieve an initial template. In one embodiment an operator loads in an input video sequence at step 72, and selects points or line segments approximating a boundary of the object at step 74. A segmentation then is applied at step 76 to more accurately define the boundary. The segmentation is performed using an active contour model, as described below in a separate section.

The edge points which define the object boundary are output at step 78. Such edge points are used as control points for another plug-in, such as to define and overlay an object mask (i.e., template) onto the image frame to visually distinguish the object being tracked. Also, the operator may adjust points on the boundary to refine the boundary, and re-execute the segmentation algorithm using the refined boundary points to achieve a desired and accurate object. Such object serves as an initial template for locating the object in another frame.

In a preferred embodiment, the located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such approach the initial template is always changing for each frame to be processed.

Prior to tracking the object among successive frames, the sequence of image frames are preprocessed at step 79 to extract information pertaining to a background image. In a preferred embodiment, the background is generally stationary and the view of the background as captured from a camera is generally static. Some variations are expected in the background. For example, shadows from a foreground object can alter the specific background imagery. A method for extracting background information and deriving a model of the background is included below in a separate section. The derived background model is used during object segmentation of the tracked object during the sequence of image frames.

Figure 4:
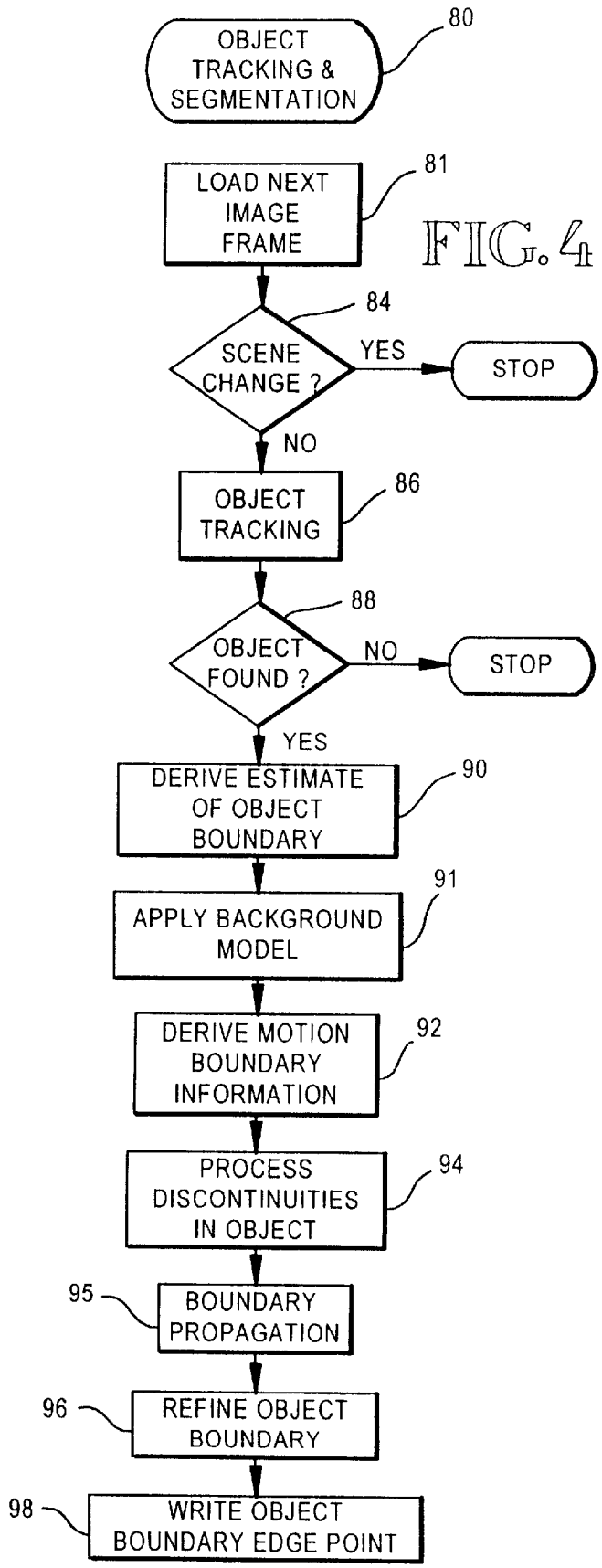
FIG. 4 is a flow chart of an object tracking and segmentation method according to an embodiment of this invention.

FIG. 4 is a flow chart 80 for tracking an image object in subsequent frames following identification and segmentation of the object in an initial frame. At step 81 the next image frame to be processed is input. At step 84 testing is performed to identify whether there has been a scene change. Although various approaches may be implemented, in one embodiment a modified applied resonance theory M-ART2 method is performed as described in commonly-assigned U.S. patent application Ser. No. 09/323,501 filed Jun. 10, 1999 naming Sun et al. titled, "Video Object Segmentation Using Active Contour Model with Global Relaxation," incorporated herein by reference and made a part hereof.

If a scene change is detected at step 84, then the process 80 is complete, or is re-initialized to track another image object and build another background model. If a scene change has not occurred, then the image object is coarsely identified from the image frame at step 86, using any of various object tracking techniques. In one embodiment a two-dimensional correlative auto-predictive search (2D-CAPS) process is performed. In another embodiment a three-dimensional correlative auto-predictive search (3D-CAPS) process is performed. If at step 88 the image object is not found using the 2D-CAPS process, then the process 80 terminates or re-initializes for tracking another object.

If the object is identified, then the final object contour derived for the prior image frame serves as the initial estimate of the object for the current image frame. Such initial estimate is preprocessed at step 90 to refine the estimate based upon local affine identification and deformation, a gradient descent analysis, an active contour model or another segmentation methodology. A process for local affine deformation processing is described in U.S. patent application Ser. No. 09/500,116 filed Feb. 8, 2000 naming Sun et al. titled, "Detecting and Segmenting Local deformation in a Tracked Video Object," which is incorporated herein by reference.

At step 91, image data for the current image frame is normalized using the background model derived at step 79. At step 92, motion boundary information is derived for the current image frame. At step 94 discontinuities in the identified object for the current frame are processed. At step 95, a boundary propagation methodlogy is applied to refine the object boundary based upon the motion boundary information and the applied background model. At step 96, the object boundary is revised, such as with an active contour model to derive a final estiamte of the object boundary for the current image frame. The edge points for the object boundary are output at step 98. As described above for the initial image frame, in some embodiments the output is written to a buffer, a file, and/or to a video screen. The process 80 of object tracking and segmentation then is repeated for another image frame in the sequence of image frames. As a result, an image object is segmented and tracked over many image frames.

Following are descriptions of (i) the background model as derived in step 79 and applied in step 91, (ii) the motion boundary processing; the processing of discontinuities, and the boundary propagation method. Refinement of the object boundary at step 96 is performed using an active contour model or another segmentation process. Exemplary refining processes are the boundary estimation processes described in coomonly assigned U.S. patent application Ser. No. 09/323,501 filed Jun. 10, 1999 naming Sun et al. titled, "Video Object Segmentation Using Active Contour Model with Global Relaxation;" and commonly-assigned U.S. patent application Ser. No. 09/500,259 filed Feb. 8, 2000 naming Schoepflin et al. titled, "Morphological Postprocessing for Object Tracking and Segmentation."

Background Modelling

Best results of the background model are achieved when the background image is stable and captured from a static viewpoint. Preferably a background model is developed for a given image scene over which an object is to be tracked. Upon a change in scene a new background model is generated. Thus, the background model is derived as a preprocessing task before the image object is fully tracked and segmented for an entire sequence of image frames.

In an initial image frame for which an initial object segmentation is derived, background information also is derived. Background information also is extracted from successive image frames. A scene change detection algorithm is performed for each successive image frame to determine whether a scene change has occurred. If no scene change has occurred, then the background information is extracted for the image frame. The background information from each image frame is compiled to derive a background model.

Figure 5:
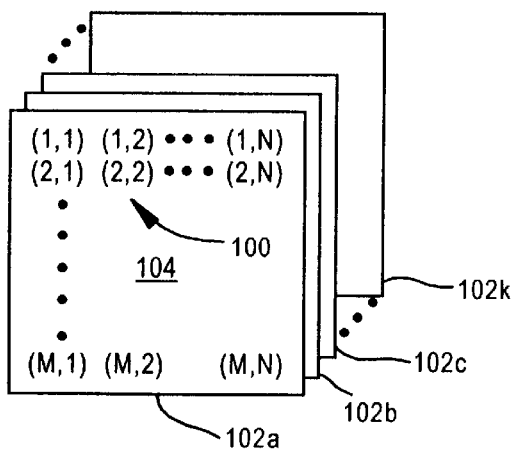
FIG. 5 is a diagram of image data arrays for a plurality of image frames.

Various methods may be implemented to derive a background model, such as using a single Gaussian per pixel model, or a mixture of Gaussians model. In a new model described herein, luminance values are compiled for pixels in the various image frames. Referring to FIG. 5, image data locations 100 for each of a plurality (e.g., 'k') image frames 102 are shown. Each image frame is formed by an array 104 of image pixels. There is image data for each pixel. As shown there are M×N pixel locations in each array 104. The pixel locations are shown with array addressing, (e.g., (1,1), (1,2), . . . (1,N) through (M,N)). There is an image pixel at address (1,1) in each image frame 102$i$.

Figure 6:
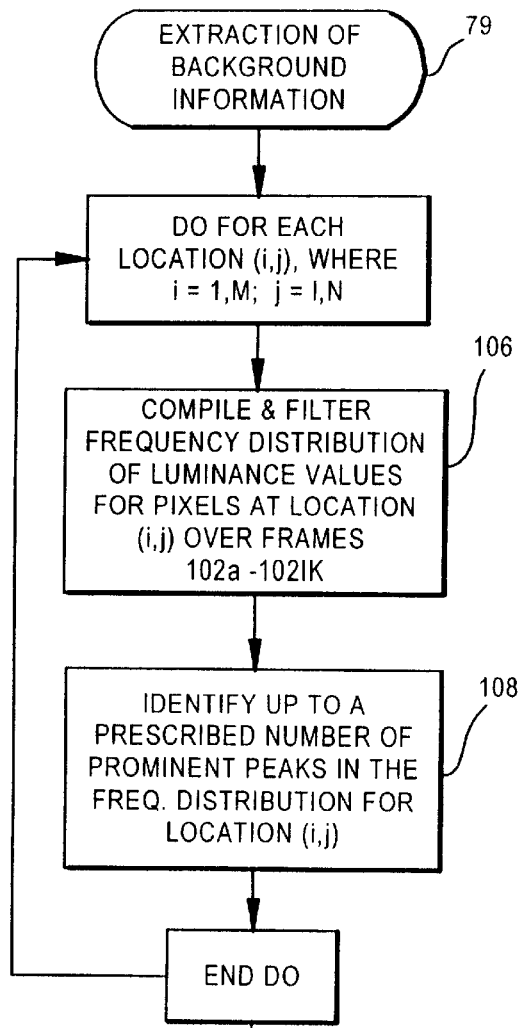
FIG. 6 is a flow chart of a method for extracting background information according to an embodiment of this invention.
Figure 7:
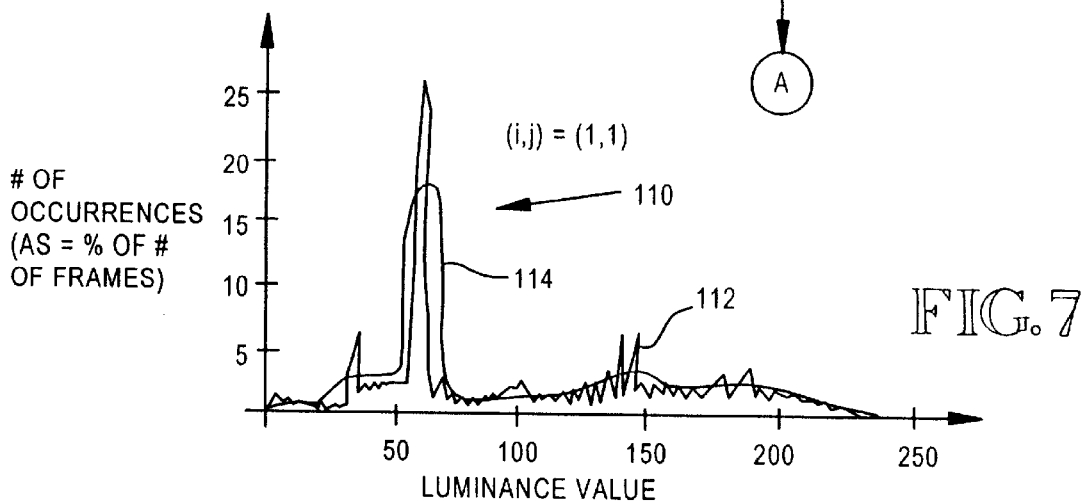
FIG. 7 is a graph of a frequency distribution of luminance values for a given pixel location for an example sequence of image frames.

Referring to FIG. 6, a flow chart for the extraction process 79 is performed for each location (i,j) of the array 104. At step 106, the luminance values for each image pixel at location (ij) are compiled for all the image frames 102$a$–102$k$ in the current scene. Referring to FIG. 7, a frequency distribution 110 for the luminance values of pixel (1,1) is shown. One curve 112 shows the raw distribution. A smoothed curve 114 shows the distribution after undergoing a low pass filtering operation. For each location up to a prescribed number of prominent peaks (e.g., 3) are extracted from a smoothed representation of the luminance values at step 108. In one embodiment a peak is prominent if the number of pixels corresponding to the luminance for such peak is at least 5% of the number of image frames in the scene used to compile the background model. When there are more than the prescribed number of prominent peaks only the most prominent peaks are considered.

Where only one peak is prominent, then such location is likely to correspond to either the background image or the foreground image for every image frame in the scene. Where there are multiple peaks, there is likely to be an occlusion of the background by a foreground image in some of the image frames.

The retained prominent peaks for a given pixel location are part of the background model for the current scene. Steps 106, 108 are repeated for each pixel location to obtain background modelling information for each location in the array 104.

Once the prominent peaks are derived an average background value is derived for each location(i,j). In determining the average the background information is to be distinguished from the foreground information. The initial object boundary identified at step 76 (FIG. 3) is used to estimate the foreground luminances. The flow chart for process 79 continues in FIG. 8. At step 116, a given location is tested to determine if it is within the object boundary. If outside the object boundary, then a background value is selected from the background model at step 118. Specifically, the prominent peak for location (i,j) is selected which is closest to the luminance value for the pixel at location (i,j) of the current image frame. The selected value is referred to as the average background luminance value for location (i,j). The next pixel of the image frame then is processed. If the location of the pixel is within the object boundary, then at step 120 all prominent peaks in the background model for location (i,j) which are within a prescribed tolerance of the luminance value for location (i,j) of the initial image frame are rejected. It is expected that all such values correspond to the foreground object. At step 122, the background model is tested to determine if there are any remaining peaks for location (i,j). If there are no remaining peaks, then at step 124, the background value for location (i,j) is uncertain for the current image frame. Should the operator display the average background image without a foreground object, the uncertainty will appear as a pixel of a prescribed value (e.g., black; white). If there are remaining peaks in the background model for location (i,j), then the remaining peak which is closest to an average background value for the four neighboring locations is selected as the average background luminance value for location (i,j).

In addition to driving an average background luminance value for each location, a standard deviation also is derived based on the frequency distribution for the prominent peak selected.

The background model is applied at step 91 (see FIG. 4) to a current image frame in the sequence of image frames for use in the motion boundary extraction. For a given image frame the absolute difference between the given image frame and the background model is performed and normalized on a pixel by pixel basis using the standard deviations derived with the background model. This process is referred to as normalized background substraction. For each pixel there is a normalized background value defined as being within 1, 2, 3 or more standard deviations from the corresponding mean background value for the pixel location as defined in the background model.

When normalizing the data, locations which do not correspond to the background model will be found to be uncertain. If uncertain values are displayed in white and the normalized background is displayed in black, then an image of this normalized background subtraction will provide an estimate of the image object for the given image frame.

Because noise is likely to occur in some frames, an adaptive background model is applied in some embodiments. Stauffer and Grimson describe a background learning or updating process in "Adaptive Background Mixture Models for Real-Time Tracking," Proceedings of the Eighteenth IEEE Conference on CVPR, Vol. 2, pp 246–252, 1999 as follows:

$$\mu_{k,t+1} = (1-\rho)^* \mu_{k,t} + \rho \chi_{k,t}$$

$$\sigma^2_{k,t+1} = (1-\rho)^* \sigma^2_{k,t} + \rho^* (\chi_{k,t} - \mu_{k,t})^T (\chi_{k,t} - \mu_{k,t})$$

$$\rho = \alpha^* \eta(\chi_{k,t}, \mu_{k,t}, \sigma_{k,t})$$

where $\eta(\chi_{k,t}, \mu_{k,t}, \sigma_{k,t})$ represents the adaptive Gaussian distribution for the pixel k at time t ($\chi_{k,t}$) with the mean of $\mu_k$ and the standard deviation of $\sigma_k$, and where a is a user controlled learning rate. ρ controls the contribution of the current pixel value to the background model. With this learning process the background model is updated in some embodiments continuously. In one embodiment where the frequency distribution of a pixel achieves a result of 'uncertain' using the model described in FIG. 6, the background model is updated continuously using the adaptive Gaussian distribution until a Gaussian model is established for such pixel(s).

Motion Boundary Extraction

Motion boundary information is extracted from a given image frame at step 92 of the object tracking and segmentation process 80. FIGS. 9a–9c show three successive image frames A, B, C having part numbers 130–132. A simplified image sequence is shown here for purposes of illustration. In practice, video image frames are preferred. Each image frame includes a generally static background 134 and a moving foreground object 136. A motion boundary is a contour of image pixel content which appears to move from one from to another frame.

In one embodiment the motion boundary for a current image frame is derived by calculating a frame difference among successive frames. FIG. 10a shows a thresholded absolute forwarded frame difference 138 for frame A (which also corresponds to a backward frame difference for frame B). FIG. 10b shows a thresholded absolute forward frame difference 140 for frame B. The threshold is selected in one embodiment as three times the standard deviation of all the background pixels in the corresponding background model. Due to background occlusion, a double image error 142 occurs in these frame differences. The backward frame difference and forward frame difference for a given image frame are combined using an 'AND' operation to eliminate the double image error. FIG. 11 shows the combined frame difference 144 for image frame B which delineates the motion boundary 146 for frame B. Specifically, the pixel locations of the motion boundary are identified.

Processing Object Discontinuities

Figure 12:
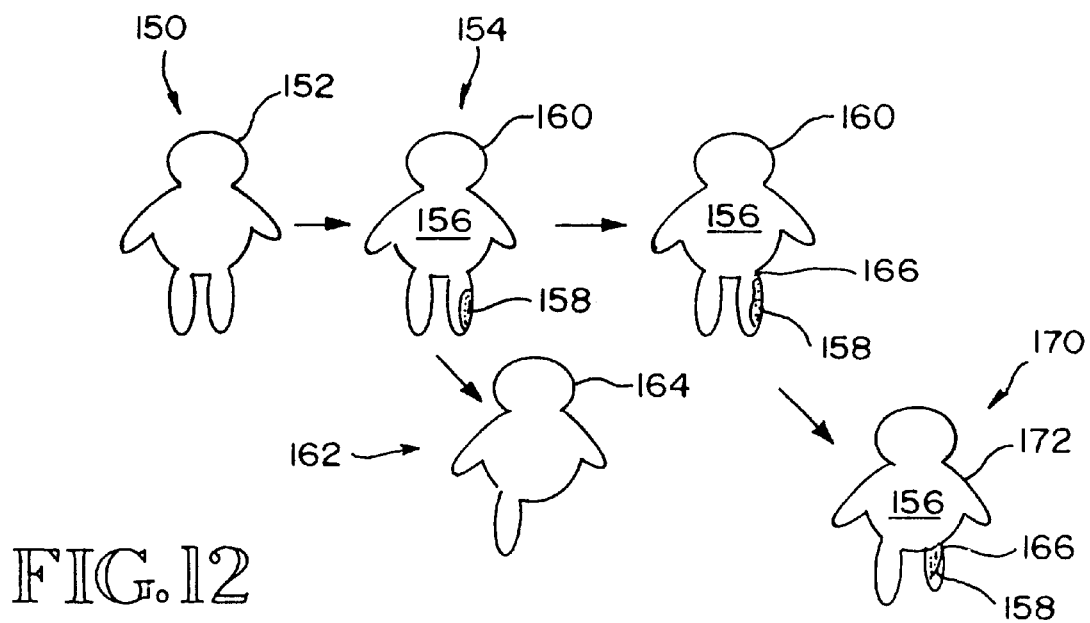
FIG. 12 is a depiction of an image object and object boundary illustrating a method for coupling decoupled regions of an image object.

Although the tracked object is defined by a closed contour (e.g., the object boundary), the object found during object tracking at step 86 may be discontinuous, including one dominant region and one or more nonconnected smaller regions. Referring to FIG. 12, object 150 corresponds to the image object tracked in a prior image frame. The final object boundary 152 derived during step 96 for such prior image frame also is shown. Object 154 corresponds to the same image object tracked in the current frame. Notice that the object now appears as two regions 156, 158. Both regions occur within the initial estimate 160 of the object boundary. Such initial estimate is the object boundary 152 from the prior frame or a revised estimate of such boundary 152 (obtained at step 90 for processing the current image frame—see FIG. 4).

During the boundary propagation process 95 the decoupled area 158 would likely to be lost resulting in an object 162 and object boundary 164. To avoid such situation, decoupled areas 158 may be recoupled to the dominant area 156. According to one embodiment, the dominant region is the largest region. Each decoupled area 58 which occurs within the estimated object boundary 160 is eligible to be coupled to the dominant area 56 if select criteria are met. In a preferred embodiment the criteria include: (i) a pair of regions having a narrowest gap are connected first by adding joint pixels 166; (ii) all joint pixels are part of a temporary object mask and are applied at the narrowest gap between two regions; (iii) in some embodiments a maximum gap length restricts whether joint pixels can be applied and thus areas recoupled; the coupling continues until all eligible areas are recoupled or eliminated from eligibility (e.g., due to gap length). Referring again to FIG. 12, object 170 depicts the recoupled areas 156, 158 with joint pixels 166 and a temporary object mask 172.

Boundary Propagation

At step 95 (see FIG. 4) a boundary propagation process is performed. Inputs used by the process are the estimate of the object boundary derived in step 90, the background information derived at step 79 (FIG. 3), the motion boundary information derived at step 92 and joint pixel information derived at step 94. The boundary propagation process commences from a first point of the object boundary estimate. A boundary is formed by progressing from point to point along the object boundary estimate and either propagating the boundary outwards, propagating the boundary inwards, or not adjusting the boundary at each point. The processes is iterative with the revised boundary from one iteration being the starting boundary for the next iteration.

Figure 13:
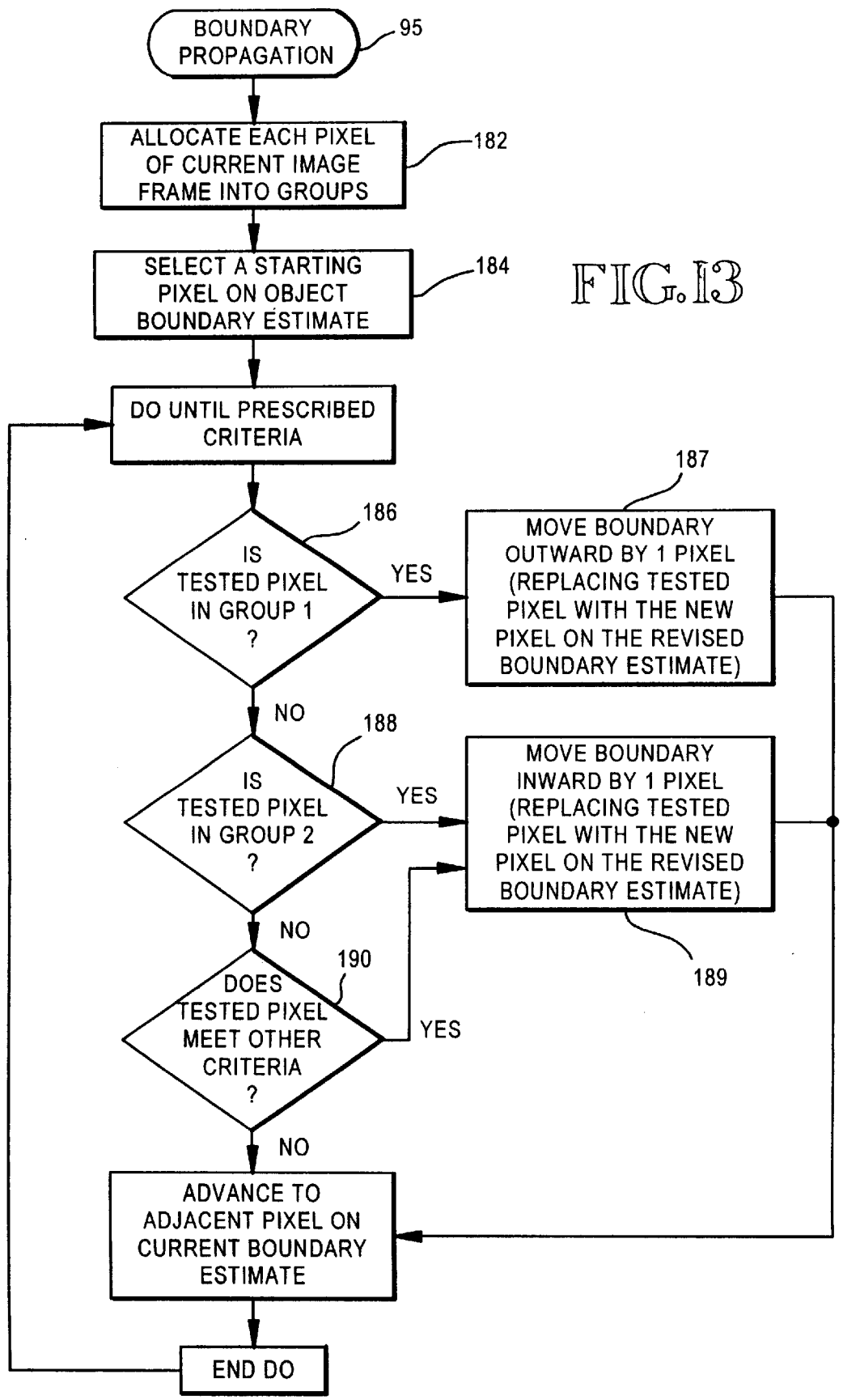
FIG. 13 is a flow chart of a boundary propagation process according to an embodiment of this invention.

Referring to FIG. 13, the boundary propagation process 95 includes a step 182 in which pixels for the current image frame are allocated among a plurality of groups. For each pixel having a location on the motion boundary derived at step 92, the pixel is included in a first group. For each joint pixel identified in step 94, the pixel is allocated to group 1. For all other pixels, the normalized background substraction results from step 91 are used. If the normalized background substraction value for the current pixel is greater than 3 (e.g., more than 3 standard deviations from the mean background value for that pixel location in the sequence of image frames), then the pixel also is included in the first group.

If the normalized background substraction value for the current pixel is less than 0.4 (e.g., within 0.4 standard deviations of the mean background value for that pixel location in the sequence of image frames), then the pixel is allocated to group 2. The remaining pixel are allocated to group 3. In a preferred embodiment morphological filtering is performed on the pixels allocated into group 1 to account for noise. Any pixels filtered out are placed in group 3. In one embodiment a morphological closing operation is performed followed by a morphological opening with for example a 3×3 structuring element. Accordingly, group 1 is expected to include mostly pixels on a foreground object, while group 2 is expected to include mostly pixels in the background imagery.

Referring again to FIG. 13, at step 184 a starting pixel is selected from the estimate of the object boundary input to the boundary propagation process 95. Various selection criteria may be used to select a starting pixel. Also, propagation along the boundary may proceed either clockwise or counterclockwise, according to the embodiment. At step 186 and 188 the pixel is tested to identify the group to which it has been allocated. If allocated to group 1, then the object boundary estimate at such pixel is propagated outward at step 187. Accordingly, a new pixel replaces the tested pixel on the object boundary to achieve a revised object boundary estimate. Conversely, if allocated to group 2, then the object boundary estimate at such pixel is propagated inward at step 189. Again, a new pixel replaces the tested pixel on the object boundary to achieve a revised object boundary estimate. If the current pixel being tested is in group 3, then additional testing is performed on the pixel at step 190. If not already derived, then an edge energy is calculated for the current image frame. Edge energy is a measure of the potential energy of a set of image pixels which identifies an edge based upon the relative energy values of pixels. Various measures of potential energy may be implemented. In one embodiment a multiple level wavelet decomposition algorithm is used to extract high frequency components of an image. The tangent to the object boundary at the tested pixel is derived and compared with the tangent of a point on an edge determined by the edge energy calculation at the tested point. If the angle between the two derived tangents is greater than, for example, pi/4 and the edge energy at the tested pixel is less than, for example, 1% of the maximum edge energy along the object boundary estimate derived at step 90, then the pixel boundary is propagated as for the group 2 pixels. Specifically, the object boundary estimate at the group 3 tested pixel is propagated inward at step 189. A new pixel replaces the tested pixel on the object boundary to achieve a revised object boundary estimate. In other embodiments the exemplary values may vary.

After the current pixel is tested and the boundary propagated outward, inward or not at all, then the next pixel to be tested on the current boundary estimate is selected. Steps 186–190 are repeated for each tested pixel. Various criteria are implemented in varying embodiments to discontinue the boundary propagation. In one embodiment, a fixed number of iterations are performed. Specifically, for an input object boundary estimate having x pixels, one iteration encompasses testing each one of the x pixels and either propagating the boundary outward, inward or not at all at each one of the x pixels. The propagation selection is based upon the testing in steps 186–190. For a subsequent iteration there again are x pixels forming the current boundary estimate. However, the specific pixels included among the x pixels may vary from the prior iteration due to boundary propagation. In another embodiment rather than perform a fixed number of iterations, the results are compared for a set of iterations to determine whether the boundary is oscillating back and forth. If so, then the propagation is complete.

Upon completion of the boundary propagation, there is an output estimate of the object boundary. Such output estimate is refined at step 96 (see FIG. 4) using an active contour model or another refining process.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for estimating a desired contour of an image object which is tracked over a sequence of image frames, each image frame comprising a plurality of image data, comprising the steps of:

extracting a background model of an image background from the sequence of image frames;

for a given image frame among the sequence of image frames, applying the background model to the given image frame to derive background information for the given image frame;

for the given image frame, extracting motion information corresponding to said given image frame, said motion information comprising image data at which movement occurs within said given image frame relative to either one or both of a prior image frame and a subsequent image frame;

for the given image frame, allocating the plurality of image data for said given image frame among a plurality of groups based upon the background information for the given image frame and the motion information for said given image frame, wherein a first group of the plurality of groups corresponds to image data at which motion occurs and a second group corresponds to image data correlating to the background model;

receiving one estimate of the desired contour of the image object for the given image frame, said one estimate comprising a plurality of data points; and adjusting the estimate of the desired contour for the given image frame by progressing from data point to data point among the plurality of data points of said one estimate and updating points included in the desired contour to achieve an updated estimate of the desired contour, said adjusting comprising, for a given point:

(a) when the given point is among the first group of the plurality of groups, adjusting the estimate of the desired contour outwards at said given point; and (b) when the given point is among the second group among the plurality of groups, adjusting the estimate of the desired contour inwards at said given point.

2. The method of claim 1, further comprising the step of:

repeating the step of adjusting in an iterative fashion, wherein the updated estimate of the desired contour for one iteration serves as the estimate which is adjusted during a next iteration.

3. The method of claim 2, further comprising after the step of repeating, the step of:

applying an active contour model to the updated estimate of the desired contour to derive a final estimate of the desired contour for the given image frame.

4. The method of claim 1, wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the step of extracting the background model comprises:

for each one relative pixel location, compiling the luminance value corresponding to each corresponding pixel in each corresponding image pixel array for a plurality of image frames among the sequence of image frames to achieve a plurality of sets of luminance values, wherein there is one set for said each one relative pixel location; and deriving a luminance value in the background model for said each one relative pixel location based upon a frequency distribution of luminance values at said each one relative pixel location among the plurality of image pixel arrays corresponding to the sequence of image frames.

5. The method of claim 1, wherein the step of extracting motion information comprises:

comparing the given image frame with the subsequent image frame and the prior image frame to derive a subset of motion image data for the given image frame which corresponds to motion which occurs among said prior image frame, given image frame and subsequent image frame.

6. The method of claim 1, wherein the step of allocating the plurality of image data for said given image frame among a plurality of groups, comprises allocating a given image data of the plurality of image data to the second group when the given image data corresponds within a prescribed variation with the background model as applied to the given image frame.

7. The method of claim 1, wherein the step of allocating the plurality of image data for said given image frame among a plurality of groups, comprises allocating a given image data of the plurality of image data to the first group when the given image data varies by a prescribed threshold with the background model as applied to the given image frame.

8. The method of claim 1, further comprising before the step of adjusting the estimate, the steps of:
   receiving a tracked image object for the given image frame;
   for the given image frame, comparing the received one estimate of the object boundary with the tracked image object to identify discontinuities in the tracked image object occurring within a periphery defined by the one estimate of the object boundary;
   filling in an identified discontinuity by altering image data for image pixels in an area of discontinuity; and
   assigning the altered image data to said first group.

9. A method for estimating a desired contour of an image object which is tracked over a sequence of image frames, each image frame comprising a plurality of image data, comprising the steps of:
   extracting a background model of an image background from the sequence of image frames;
   for a given image frame among the sequence of image frames, applying the background model to the given image frame to derive background information for the given image frame;
   for the given image frame, extracting motion information corresponding to said given image frame, said motion information comprising image data at which movement occurs within said given image frame relative to either one or both of a prior image frame and a subsequent image frame;
   for the given image frame, allocating the plurality of image data for said given image frame among a plurality of groups based upon the background information for the given image frame and the motion information for said given image frame;
   receiving one estimate of the desired contour of the image object for the given image frame, said one estimate comprising a plurality of data points; and
   adjusting the estimate of the desired contour for the given image frame by progressing from data point to data point among the plurality of data points of said one estimate and updating points included in the desired contour to achieve an updated estimate of the desired contour, said adjusting comprising, for a given point:
   (a) when the given point is among a first group of the plurality of groups, adjusting the estimate of the desired contour outwards at said given point; and
   (b) when the given point is among a second group among the plurality of groups, adjusting the estimate of the desired contour inwards at said given point;
   wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the step of extracting the background model comprises:
   for each one relative pixel location, compiling the luminance value corresponding to each corresponding pixel in each corresponding image pixel array for a plurality of image frames among the sequence of image frames to achieve a plurality of sets of luminance values, wherein there is one set for said each one relative pixel location;
   processing said each one set to achieve said background model, wherein said step of processing comprises deriving up to three model luminance values for each one set of luminance values.

10. The method of claim 9, wherein the up to three model luminance values derived for a given one set of said each one set of luminance values are derived using prominence as a criteria, and wherein luminance value is prominent when the number of pixels corresponding to the prominent luminance value is at least 5% of the number of image frames.

11. The method of claim 9, wherein the step of processing further comprises deriving an average background value for each one relative pixel location for each image frame, the step of deriving the average background value comprising:
   for each image frame, testing said each one relative pixel location to determine whether it is part of the image object for the current image frame; and
   when said each one relative pixel location is not part of the image object for the current frame, selecting one value of the corresponding up to three luminance values which is closest to the luminance value for said each one relative pixel location of the current image frame.

12. The method of claim 11, wherein when said each one relative pixel location is part of the image object for the current frame, rejecting each value of the corresponding up to three luminance values which are within a prescribed tolerance of the luminance value for said each one relative pixel location of the current image frame, and when there is a remaining value of the up to three luminance values for said one relative pixel location after the step of rejecting, choosing one value of the remaining values which is closest to an average background value for a plurality of neighboring pixel locations of the current image frame.

13. The method of claim 9, wherein for a case in which more than one model luminance value is achieved for a given set of luminance values, the corresponding pixel location is considered to be occluded by a foreground object over at least a portion of the sequence of image frames.

14. A method for estimating a desired contour of an image object which is tracked over a sequence of image frames, each image frame comprising a plurality of image data, comprising the steps of:
   extracting a background model of an image background from the sequence of image frames;
   for a given image frame among the sequence of image frames, applying the background model to the given image frame to derive background information for the given image frame;

for the given image frame, extracting motion information corresponding to said given image frame, said motion information comprising image data at which movement occurs within said given image frame relative to either one or both of a prior image frame and a subsequent image frame;

for the given image frame, allocating the plurality of image data for said given image frame among a plurality of groups based upon the background information for the given image frame and the motion information for said given image frame;

receiving one estimate of the desired contour of the image object for the given image frame, said one estimate comprising a plurality of data points; and adjusting the estimate of the desired contour for the given image frame by progressing from data point to data point among the plurality of data points of said one estimate and updating points included in the desired contour to achieve an updated estimate of the desired contour, said adjusting comprising, for a given point:
  (a) when the given point is among a first group of the plurality of groups, adjusting the estimate of the desired contour outwards at said given point; and
  (b) when the given point is among a second group among the plurality of groups, adjusting the estimate of the desired contour inwards at said given point;

wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the step of extracting the background model comprises:
  for each one relative pixel location, compiling the luminance value corresponding to each corresponding pixel in each corresponding image pixel array for a plurality of image frames among the sequence of image frames to achieve a plurality of sets of luminance values, wherein there is one set for said each one relative pixel location;
  processing said each one set to achieve said background model,
  wherein the step of applying the background model to the given image frame comprises, for each one pixel of the given image frame, evaluating the corresponding luminance value using the background model.

15. A method for estimating a desired contour of an image object which is tracked over a sequence of image frames, each image frame comprising a plurality of image data, comprising the steps of:

extracting a background model of an image background from the sequence of image frames;

for a given image frame among the sequence of image frames, applying the background model to the given image frame to derive background information for the given image frame;

for the given image frame, extracting motion information corresponding to said given image frame, said motion information comprising image data at which movement occurs within said given image frame relative to either one or both of a prior image frame and a subsequent image frame;

for the given image frame, allocating the plurality of image data for said given image frame among a plurality of groups based upon the background information for the given image frame and the motion information for said given image frame;

receiving one estimate of the desired contour of the image object for the given image frame, said one estimate comprising a plurality of data points; and adjusting the estimate of the desired contour for the given image frame by progressing from data point to data point among the plurality of data points of said one estimate and updating points included in the desired contour to achieve an updated estimate of the desired contour, said adjusting comprising, for a given point:
  (a) when the given point is among a first group of the plurality of groups, adjusting the estimate of the desired contour outwards at said given point; and
  (b) when the given point is among a second group among the plurality of groups, adjusting the estimate of the desired contour inwards at said given point;

wherein the step of extracting motion information comprises:
  comparing the given image frame with the subsequent image frame and the prior image frame to derive a subset of motion image data for the given image frame which corresponds to motion which occurs among said prior image frame, given image frame and subsequent image frame;
  wherein the step of allocating the plurality of image data for said given image frame among a plurality of groups, comprises allocating a given image data of the plurality of image data to the first group when the given image data is among said subset of motion image data.

16. A method for estimating a desired contour of an image object which is tracked over a sequence of image frames, each image frame comprising a plurality of image data, comprising the steps of:

extracting a background model of an image background from the sequence of image frames;

for a given image frame among the sequence of image frames, applying the background model to the given image frame to derive background information for the given image frame;

for the given image frame, extracting motion information corresponding to said given image frame, said motion information comprising image data at which movement occurs within said given image frame relative to either one or both of a prior image frame and a subsequent image frame;

for the given image frame, allocating the plurality of image data for said given image frame among a plurality of groups based upon the background information for the given image frame and the motion information for said given image frame;

receiving one estimate of the desired contour of the image object for the given image frame, said one estimate comprising a plurality of data points; and adjusting the estimate of the desired contour for the given image frame by progressing from data point to data point among the plurality of data points of said one estimate and updating points included in the desired contour to achieve an updated estimate of the desired contour, said adjusting comprising, for a given point:
  (a) when the given point is among a first group of the plurality of groups, adjusting the estimate of the desired contour outwards at said given point; and (b) when the given point is among a second group among the plurality of groups, adjusting the estimate of the desired contour inwards at said given point;
wherein the step of allocating the plurality of image data for said given image frame among a plurality of groups, comprises:
allocating a given image data of the plurality of image data to a third group when the given image data does not correspond to the extracted motion information and varies by more than the prescribed variation and less than the prescribed threshold with the background model as applied to the given image frame.

17. An apparatus for estimating a desired contour of an image object which is tracked over a sequence of image frames, each image frame comprising a plurality of image data, comprising the steps of:
means for extracting a background model of an image background from the sequence of image frames, wherein the background model comprises a plurality of pixels, the extracting means comprising means for defining a luminance value for each pixel among a second plurality of pixels from a frequency distribution of luminance values of correspondingly located pixels among the sequence of image frames;
means for applying, for a given image frame among the sequence of image frames, the background model to the given image frame to derive background information for the given image frame;
means for extracting, for the given image frame, motion information corresponding to said given image frame, said motion information comprising image data at which movement occurs within said given image frame relative to either one or both of a prior image frame and a subsequent image frame;
means for allocating, for the given image frame, the plurality of image data for said given image frame among a plurality of groups based upon the background information for the given image frame and the motion information for said given image frame;
means for receiving one estimate of the desired contour of the image object for the given image frame, said one estimate comprising a plurality of data points; and
means for adjusting the estimate of the desired contour for the given image frame by progressing from data point to data point among the plurality of data points of said one estimate and updating points included in the desired contour to achieve an updated estimate of the desired contour, said adjusting means comprising, for a given point:
(a) means for adjusting, when the given point is among a first group of the plurality of groups, the estimate of the desired contour outwards at said given point; and
(b) means for adjusting, when the given point is among a second group among the plurality of groups, the estimate of the desired contour inwards at said given point.

18. An apparatus for estimating a desired contour of an image object which is tracked over a sequence of image frames, each image frame comprising a plurality of image data, comprising the steps of:
a first processor which extracts a background model of an image background from the sequence of image frames;
a second processor which applies, for a given image frame among the sequence of image frames, the background model to the given image frame to derive background information for the given image frame;
a third processor which extracts, for the given image frame, motion information corresponding to said given image frame, said motion information comprising image data at which movement occurs within said given image frame relative to either one or both of a prior image frame and a subsequent image frame;
a fourth processor which allocates, for the given image frame, the plurality of image data for said given image frame among a plurality of groups based upon the background information for the given image frame and the motion information for said given image frame, wherein a first group of the plurality of groups corresponds to image data at which motion occurs and a second group corresponds to image data correlating to the background model;
a fifth processor which receives one estimate of the desired contour of the image object for the given image frame, said one estimate comprising a plurality of data points; and
a sixth processor which adjusts the estimate of the desired contour for the given image frame by progressing from data point to data point among the plurality of data points of said one estimate and updating points included in the desired contour to achieve an updated estimate of the desired contour, said sixth processor:
(a) adjusting, when the given point is among the first group of the plurality of groups, the estimate of the desired contour outwards at said given point; and
(b) adjusting, when the given point is among the second group among the plurality of groups, the estimate of the desired contour inwards at said given point.

19. The apparatus of claim 18, wherein the first processor, second processor, third processor, fourth processor, fifth processor and sixth processor are the same processor.

20. The apparatus of claim 18, wherein the sixth processor adjusts the estimate in an iterative fashion, wherein the updated estimate of the desired contour for one iteration serves as the estimate which is adjusted during a next iteration.

21. The apparatus of claim 20, further comprising an active contour model applied to the updated estimate of the desired contour to derive a final estimate of the desired contour for the given image frame.

22. The apparatus of claim 18, wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the first processor:
for each one relative pixel location, compiles the luminance value corresponding to each corresponding pixel in each corresponding image pixel array for a plurality of image frames among the sequence of image frames to achieve a plurality of sets of luminance values, wherein there is one set for said each one relative pixel location; and
derives a luminance value in the background model for said each one relative pixel location based upon a frequency distribution of luminance values at said each one relative pixel location among the plurality of image pixel arrays corresponding tp the sequence of image frames.

23. The apparatus of claim 18, wherein the third processor compares the given image frame with the subsequent image frame and the prior image frame to derive a subset of motion image data for the given image frame which corresponds to motion which occurs among said prior image frame, given image frame and subsequent image frame.

24. The apparatus of claim 18, wherein the fourth processor allocates a given image data of the plurality of image data to the second group when the given image data corresponds within a prescribed variation with the background model as applied to the given image frame.

25. The apparatus of claim 18, wherein the fourth processor allocates a given image data of the plurality of image data to the first group when the given image data varies by a prescribed threshold with the background model as applied to the given image frame.

26. The apparatus of claim 18, which receives a tracked image object for the given image frame, and further comprising, for the given image frame, a seventh processor which compares the received one estimate of the object boundary with the tracked image object to identify discontinuities in the tracked image object occurring within a periphery defined by the one estimate of the object boundary, the seventh processor filling in an identified discontinuity by altering image data for image pixels in an area of discontinuity; and assigning the altered image data to said first group.

27. An apparatus for estimating a desired contour of an image object which is tracked over a sequence of image frames, each image frame comprising a plurality of image data, comprising the steps of:
a first processor which extracts a background model of an image background from the sequence of image frames;
a second processor which applies, for a given image frame among the sequence of image frames, the background model to the given image frame to derive background information for the given image frame;
a third processor which extracts, for the given image frame, motion information corresponding to said given image frame, said motion information comprising image data at which movement occurs within said given image frame relative to either one or both of a prior image frame and a subsequent image frame;
a fourth processor which allocates, for the given image frame, the plurality of image data for said given image frame among a plurality of groups based upon the background information for the given image frame and the motion information for said given image frame;
a fifth processor which receives one estimate of the desired contour of the image object for the given image frame, said one estimate comprising a plurality of data points; and
a sixth processor which adjusts the estimate of the desired contour for the given image frame by progressing from data point to data point among the plurality of data points of said one estimate and updating points included in the desired contour to achieve an updated estimate of the desired contour, said sixth processor:
  (a) adjusting, when the given point is among a first group of the plurality of groups, the estimate of the desired contour outwards at said given point; and
  (b) adjusting, when the given point is among a second group among the plurality of groups, the estimate of the desired contour inwards at said given point;
wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the first processor:
  for each one relative pixel location, compiles the luminance value corresponding to each corresponding pixel in each corresponding image pixel array for a plurality of image frames among the sequence of image frames to achieve a plurality of sets of luminance values, wherein there is one set for said each one relative pixel location; and
  processes said each one set to achieve said background model;
  wherein up to three model luminance values are derived for each one set of luminance values.

28. The apparatus of claim 27, wherein the up to three model luminance values derived for a given one set of said each one set of luminance values are derived using prominence as a criteria, and wherein luminance value is prominent when the number of pixels corresponding to the prominent luminance value is at least 5% of the number of image frames.

29. The apparatus of claim 27, wherein an average background value for each one relative pixel location for each image frame is derived, including:
for each image frame, testing said each one relative pixel location to determine whether it is part of the image object for the current image frame; and
when said each one relative pixel location is not part of the image object for the current frame, selecting one value of the corresponding up to three luminance values which is closest to the luminance value for said each one relative pixel location of the current image frame.

30. The apparatus of claim 29, wherein when said each one relative pixel location is part of the image object for the current frame, rejecting each value of the corresponding up to three luminance values which are within a prescribed tolerance of the luminance value for said each one relative pixel location of the current image frame, and when there is a remaining value of the up to three luminance values for said one relative pixel location after the step of rejecting, choosing one value of the remaining which is closest to an average background value for a plurality of neighboring pixel locations of the current image frame.

31. The apparatus of claim 27, wherein for a case in which more than one model luminance value is achieved for a given set of luminance values, the corresponding pixel location is considered to be occluded by a foreground object over at least a portion of the sequence of image frames.

32. An apparatus for estimating a desired contour of an image object which is tracked over a sequence of image frames, each image frame comprising a plurality of image data, comprising the steps of:
a first processor which extracts a background model of an image background from the sequence of image frames;
a second processor which applies, for a given image frame among the sequence of image frames, the background model to the given image frame to derive background information for the given image frame;
a third processor which extracts, for the given image frame, motion information corresponding to said given image frame, said motion information comprising image data at which movement occurs within said given image frame relative to either one or both of a prior image frame and a subsequent image frame;

a fourth processor which allocates, for the given image frame, the plurality of image data for said given image frame among a plurality of groups based upon the background information for the given image frame and the motion information for said given image frame;

a fifth processor which receives one estimate of the desired contour of the image object for the given image frame, said one estimate comprising a plurality of data points; and a sixth processor which adjusts the estimate of the desired contour for the given image frame by progressing from data point to data point among the plurality of data points of said one estimate and updating points included in the desired contour to achieve an updated estimate of the desired contour, said sixth processor:
  (a) adjusting, when the given point is among a first group of the plurality of groups, the estimate of the desired contour outwards at said given point; and
  (b) adjusting, when the given point is among a second group among the plurality of groups, the estimate of the desired contour inwards at said given point;

wherein for the sequence of image frames there is a corresponding plurality of image pixel arrays, wherein the image pixels of each one array of the plurality of image pixel arrays have corresponding image pixels in the other arrays of said plurality of image pixel arrays based upon relative pixel locations, each one array of the plurality of image pixel arrays comprising an array of image pixels, each one image pixel having a luminance value, and wherein the first processor:
  for each one relative pixel location, compiles the luminance value corresponding to each corresponding pixel in each corresponding image pixel array for a plurality of image frames among the sequence of image frames to achieve a plurality of sets of luminance values, wherein there is one set for said each one relative pixel location; and
  processes said each one set to achieve said background model;
  wherein the second processor, for each one pixel of the given image frame, evaluates the corresponding luminance value using the background model.

33. An apparatus for estimating a desired contour of an image object which is tracked over a sequence of image frames, each image frame comprising a plurality of image data, comprising the steps of:

a first processor which extracts a background model of an image background from the sequence of image frames;

a second processor which applies, for a given image frame among the sequence of image frames, the background model to the given image frame to derive background information for the given image frame;

a third processor which extracts, for the given image frame, motion information corresponding to said given image frame, said motion information comprising image data at which movement occurs within said given image frame relative to either one or both of a prior image frame and a subsequent image frame;

a fourth processor which allocates, for the given image frame, the plurality of image data for said given image frame among a plurality of groups based upon the background information for the given image frame and the motion information for said given image frame;

a fifth processor which receives one estimate of the desired contour of the image object for the given image frame, said one estimate comprising a plurality of data points; and a sixth processor which adjusts the estimate of the desired contour for the given image frame by progressing from data point to data point among the plurality of data points of said one estimate and updating points included in the desired contour to achieve an updated estimate of the desired contour, said sixth processor:
  (a) adjusting, when the given point is among a first group of the plurality of groups, the estimate of the desired contour outwards at said given point; and
  (b) adjusting, when the given point is among a second group among the plurality of groups, the estimate of the desired contour inwards at said given point;

wherein the third processor compares the given image frame with the subsequent image frame and the prior image frame to derive a subset of motion image data for the given image frame which corresponds to motion which occurs among said prior image frame, given image frame and subsequent image frame;

wherein the fourth processor allocates a given image data of the plurality of image data to the first group when the given image data is among said subset of motion image data.

34. An apparatus for estimating a desired contour of an image object which is tracked over a sequence of image frames, each image frame comprising a plurality of image data, comprising the steps of:

a first processor which extracts a background model of an image background from the sequence of image frames;

a second processor which applies, for a given image frame among the sequence of image frames, the background model to the given image frame to derive background information for the given image frame;

a third processor which extracts, for the given image frame, motion information corresponding to said given image frame, said motion information comprising image data at which movement occurs within said given image frame relative to either one or both of a prior image frame and a subsequent image frame;

a fourth processor which allocates, for the given image frame, the plurality of image data for said given image frame among a plurality of groups based upon the background information for the given image frame and the motion information for said given image frame;

a fifth processor which receives one estimate of the desired contour of the image object for the given image frame, said one estimate comprising a plurality of data points; and a sixth processor which adjusts the estimate of the desired contour for the given image frame by progressing from data point to data point among the plurality of data points of said one estimate and updating points included in the desired contour to achieve an updated estimate of the desired contour, said sixth processor:
  (a) adjusting, when the given point is among a first group of the plurality of groups, the estimate of the desired contour outwards at said given point; and
  (b) adjusting, when the given point is among a second group among the plurality of groups, the estimate of the desired contour inwards at said given point;

wherein the fourth processor allocates a given image data of the plurality of image data to a third group when the given image data does not correspond to the extracted motion information and varies by more than the prescribed variation and less than the prescribed threshold with the background model as applied to the given image frame.

35. A method for estimating a desired contour of an image object which is tracked over a sequence of image frames, each image frame comprising a plurality of image data, comprising the steps of:

extracting a background model of an image background from the sequence of image frames, wherein the background model comprises a plurality of pixels, each pixel among a second plurality of pixels having a luminance value derived from a frequency distribution of luminance values of corresponding pixels among the sequence of image frames;

for a given image frame among the sequence of image frames, applying the background model to the given image frame to derive background information for the given image frame;

for the given image frame, extracting motion information corresponding to said given image frame, said motion information comprising image data at which movement occurs within said given image frame relative to either one or both of a prior image frame and a subsequent image frame;

for the given image frame, allocating the plurality of image data for said given image frame among a plurality of groups based upon the background information for the given image frame and the motion information for said given image frame;

receiving one estimate of the desired contour of the image object for the given image frame, said one estimate comprising a plurality of data points; and adjusting the estimate of the desired contour for the given image frame by progressing from data point to data point among the plurality of data points of said one estimate and updating points included in the desired contour to achieve an updated estimate of the desired contour, said adjusting comprising, for a given point:

(a) when the given point is among a first group of the plurality of groups, adjusting the estimate of the desired contour outwards at said given point; and (b) when the given point is among a second group among the plurality of groups, adjusting the estimate of the desired contour inwards at said given point.

* * * * *